United States Patent
Nguyen

(10) Patent No.: US 12,451,802 B2
(45) Date of Patent: Oct. 21, 2025

(54) HIGH VOLTAGE SWITCHING REGULATOR WITH N-CHANNEL HIGH-SIDE SWITCHES

(71) Applicant: Empower Semiconductor, Inc., San Jose, CA (US)

(72) Inventor: Bai Nguyen, Fremont, CA (US)

(73) Assignee: Empower Semiconductor, Inc., San Jose, CA (US)

( * ) Notice: Subject to any disclaimer, the term of this patent is extended or adjusted under 35 U.S.C. 154(b) by 325 days.

(21) Appl. No.: 18/179,267

(22) Filed: Mar. 6, 2023

(65) Prior Publication Data

US 2023/0283182 A1 Sep. 7, 2023

Related U.S. Application Data

(60) Provisional application No. 63/317,460, filed on Mar. 7, 2022.

(51) Int. Cl.
| | |
|---|---|
| *H02M 3/155* | (2006.01) |
| *H02M 1/08* | (2006.01) |
| *H02M 3/00* | (2006.01) |
| *H02M 3/158* | (2006.01) |

(52) U.S. Cl.
CPC ............ *H02M 3/155* (2013.01); *H02M 1/08* (2013.01); *H02M 3/01* (2021.05); *H02M 3/1588* (2013.01)

(58) Field of Classification Search
CPC ...... H02M 3/155; H02M 1/08; H02M 1/0006; H02M 3/158; H02M 3/1588
See application file for complete search history.

(56) References Cited

U.S. PATENT DOCUMENTS

| | | | |
|---|---|---|---|
| 8,558,586 B1 | 10/2013 | Martin et al. | |
| 9,985,526 B1 * | 5/2018 | Oak | H02M 3/33507 |
| 11,855,535 B1 * | 12/2023 | Nguyen | H02M 1/08 |

(Continued)

FOREIGN PATENT DOCUMENTS

TW 202011679 A 3/2020

OTHER PUBLICATIONS

Office Action issued in related application, TW112108060, mailed Dec. 6, 2023, 7 pages.

(Continued)

*Primary Examiner* — Kyle J Moody
(74) *Attorney, Agent, or Firm* — FisherBroyles, LLP

(57) ABSTRACT

A circuit. In one aspect, the circuit includes a power input terminal and an output terminal, a high-side circuit coupled between the power input terminal and the output terminal, where the high-side circuit includes a first plurality of serially connected switches, and a low-side circuit coupled between the output terminal and a ground, where the low-side circuit includes a second plurality of serially connected switches, where a first voltage between the power input terminal and the output terminal is distributed across the first plurality of serially connected switches, where a second voltage between the output terminal and the ground is distributed across the second plurality of serially connected switches. In another aspect, the high-side and low-side circuits are arranged to limit a maximum voltage applied to each of the first plurality of switches and second plurality of switches to a fraction of a voltage at the power input terminal.

14 Claims, 6 Drawing Sheets

(56) References Cited

U.S. PATENT DOCUMENTS

2011/0148200 A1* 6/2011 Burns .................. H02M 3/158
307/43
2017/0264281 A1 9/2017 Mathad

OTHER PUBLICATIONS

P. Renz, M. Kaufmann, and B. Wicht, "Switch Stacking in Power Management ICs", IEEE Journal of Emerging and Selected Topics in Power Electronics, vol. 9, No. 3, Jun. 2021.
V. Kursun, S. G. Narendra, V. K. De and E. G. Friedman, "High input voltage step-down DC-DC converters for Integration in a low voltage CMOS process," International Symposium on Signals, Circuits and Systems. Proceedings, SCS 2003. (Cat. No.03EX720), San Jose, CA, USA, 2004, pp. 517-521.

* cited by examiner

HIGH VOLTAGE SWITCHING REGULATOR WITH N-CHANNEL HIGH-SIDE SWITCHES

CROSS-REFERENCE TO RELATED APPLICATION

This application claims priority to U.S. provisional patent application Ser. No. 63/317,460, for "High Voltage Switching Regulator With N-Channel High-Side Switches" filed on Mar. 7, 2022, which is hereby incorporated by reference in entirety for all purposes.

FIELD

The described embodiments relate generally to voltage regulators, and more particularly, the present embodiments relate to high voltage switching regulators.

BACKGROUND

A wide variety of electronic devices are available for consumers today. Many of these devices have integrated circuits that are powered by regulated low voltage DC power sources. These low voltage power sources are often generated by dedicated power converter circuits that use a higher voltage input from a battery or another power source. In some applications, the dedicated power converter circuit can be one of the largest power dissipating components of the electronic device and can sometimes consume more space than the integrated circuit that it powers. As electronic devices become more sophisticated and more compact, more efficient power converter circuits are called for.

SUMMARY

In some embodiments, a circuit is disclosed. The circuit includes a power input terminal and an output terminal, a high-side circuit coupled between the power input terminal and the output terminal, where the high-side circuit includes a first plurality of serially connected switches, and a low-side circuit coupled between the output terminal and a ground, where the low-side circuit includes a second plurality of serially connected switches, where a first voltage between the power input terminal and the output terminal is distributed across the first plurality of serially connected switches, where a second voltage between the output terminal and the ground is distributed across the second plurality of serially connected switches.

In some embodiments, the high-side circuit and the low-side circuit are arranged to limit a maximum voltage applied to each of the first plurality of switches and each of the second plurality of switches to a fraction of a voltage at the power input terminal.

In some embodiments, a value of the fraction is ⅓ or less.

In some embodiments, each of the first plurality of serially connected switches are N-channel metal oxide semiconductor transistors (NMOS).

In some embodiments, each of the second plurality of serially connected switches are N-channel metal oxide semiconductor transistors (NMOS).

In some embodiments, the circuit further includes a first bootstrap circuit that is arranged to be controlled by a first pair of bootstrap control switches that selectively transition the first bootstrap circuit between a charging configuration that charges the first bootstrap circuit, and a discharging configuration that provides a charge for a turn on of a second switch of the first plurality of serially connected switches.

In some embodiments, a circuit is disclosed. The circuit includes a power input terminal and an output terminal; a high-side circuit coupled between the power input terminal and the output terminal, where the high-side circuit includes a first plurality of serially connected switches; a low-side circuit coupled between the output terminal and a ground, where the low-side circuit includes a second plurality of serially connected switches; and a high-side driver circuit connected to a gate terminal of a first switch of the first plurality of serially connected switches; where a gate terminal of a second switch of the first plurality of the serially connected switches is connected to a drain terminal of the first switch of the first plurality of serially connected switches through a first bootstrap capacitor.

In some embodiments, the circuit further includes a low-side driver circuit connected to a gate terminal of a first switch of the second plurality of serially connected switches.

In some embodiments, a gate terminal of a second switch of the second plurality of the serially connected switches is connected to a drain terminal of the first switch of the second plurality of serially connected switches through a second bootstrap capacitor.

In some embodiments, the high-side circuit and the low-side circuit are arranged to limit a maximum voltage applied to each of the first plurality of serially connected switches and each of the second plurality of serially connected switches to a fraction of a voltage at the power input terminal.

In some embodiments, the circuit further includes a first bootstrap circuit that is arranged to be controlled by a first pair of bootstrap control switches that selectively transition the first bootstrap circuit between a charging configuration that charges the first bootstrap circuit, and a discharging configuration that provides a charge for a turn on of the second switch of the first plurality of serially connected switches.

In some embodiments, a circuit is disclosed. The circuit includes a power input terminal and an output terminal; a high-side circuit coupled between the power input terminal and the output terminal, where the high-side circuit includes a first plurality of serially connected switches; a low-side circuit coupled between the output terminal and a ground, where the low-side circuit includes a second plurality of serially connected switches; and where a first voltage between the power input terminal and the output terminal is distributed across the first plurality of serially connected switches; where a second voltage between the output terminal and the ground is distributed across the second plurality of serially connected switches; a high-side driver circuit connected to a gate terminal of a first switch of the first plurality of serially connected switches; where a gate terminal of a second switch of the first plurality of the serially connected switches is connected to a drain terminal of the first switch of the first plurality of serially connected switches through a first bootstrap capacitor.

DETAILED DESCRIPTION

Figure 1:
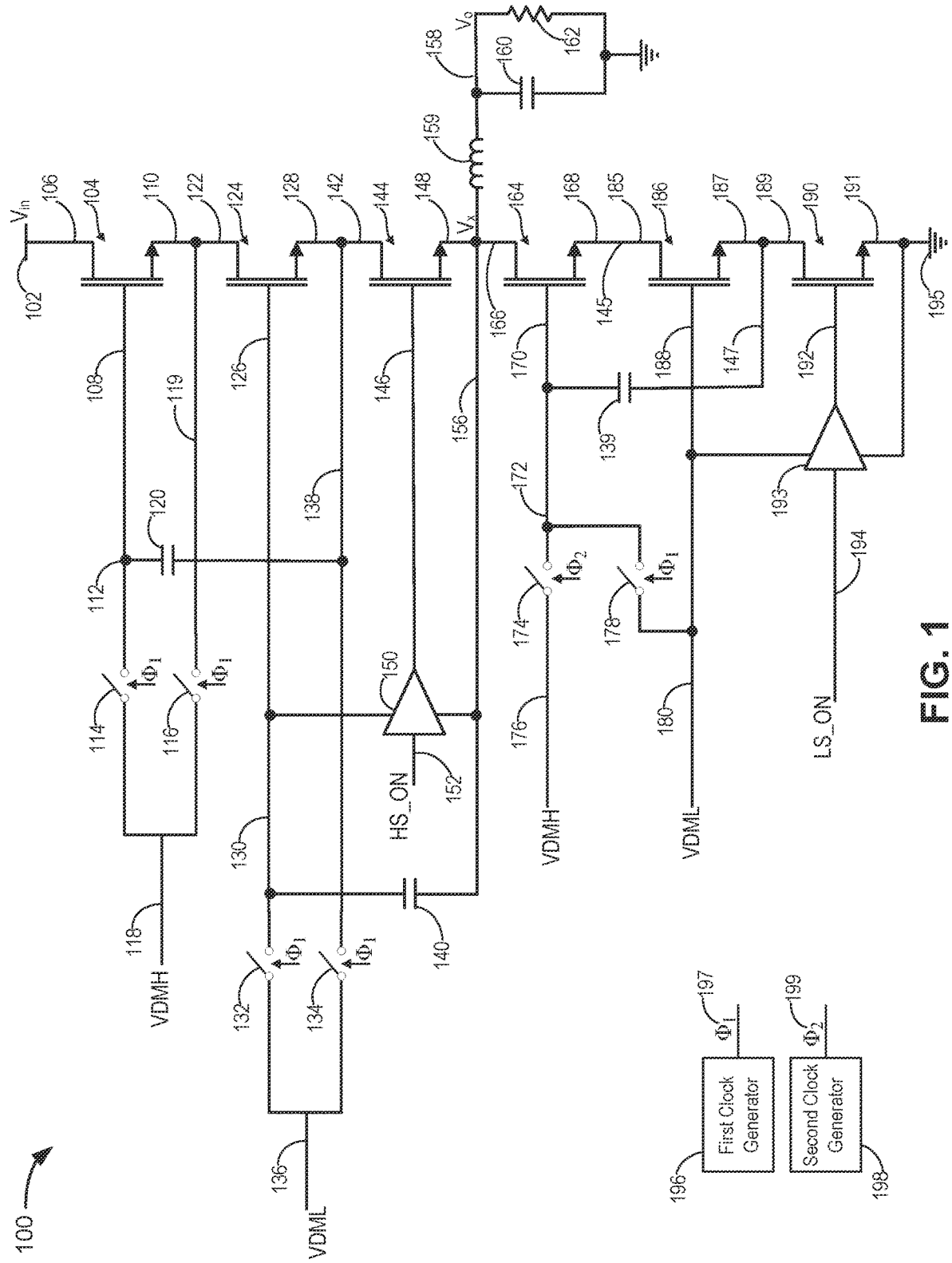
FIG. 1 illustrates a series stacked DC-DC voltage regulator circuit according to an embodiment of the disclosure.

Circuits and related techniques disclosed herein relate generally to voltage regulators. More specifically, circuits, devices and related techniques disclosed herein relate to series stacked direct-current to direct-current (DC-DC) voltage regulators. In some embodiments, series stacked DC-DC voltage regulators can employ switches that are formed in short-channel complementary metal oxide semiconductor (CMOS) processes, however any other suitable type of semiconductor switches can be used and are within the scope of this disclosure. In various embodiments, the switches may include N-channel metal oxide semiconductor transistors (NMOS). In some embodiments, the series stacked DC-DC voltage regulator may be a buck converter using cascode NMOS transistors for both high-side and low-side switches. The use of NMOS transistors as high-side switches can enable the voltage regulator to operate over a relatively wide input voltage ranges compared to voltage regulators using PMOS transistors. Further, the use of NMOS transistors can allow for relatively higher operating efficiency compared to voltage regulators using PMOS transistors, because NMOS transistors have relatively higher channel mobility and relatively lower threshold voltages as compared to their PMOS counterparts.

In some embodiments, circuits and related techniques are disclosed that can enable voltage stress balancing in a series stacked NMOS voltage regulator. Voltage stress balancing can allow a power input voltage to be distributed across several NMOS transistors such that a single transistor may encounter relatively lower voltages that are well within its safe operating area (SOA) of operation. In various embodiments, a method for self-driving some of the stacked NMOS transistors is disclosed where the voltage regulator itself is arranged to drive some of the stacked NMOS transistors. In this way, the use of separate drivers for the NMOS transistors can be eliminated resulting in relatively higher operating efficiency of the voltage regulator. In some embodiments, bootstrap capacitors can be employed in the stacked NMOS voltage regulator to provide the drive for some of the stacked NMOS transistors. Further, replenishing the bootstrap capacitors' charges can be performed using the stacked NMOS transistors. This can result in reduced power loss which enables an improvement of the overall operating efficiency of the voltage regulator. Various inventive embodiments are described herein, including methods, processes, systems, devices, and the like.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

FIG. 1 illustrates a series stacked DC-DC voltage regulator circuit 100 according to an embodiment of the disclosure. Voltage regulator circuit 100 can receive an input voltage Vin at an input node 102 and provide an output voltage Vo at an output node 158. Voltage regulator circuit 100 can include a high-side section that can include a first NMOS transistor 104, a second NMOS transistor 124 and a third NMOS transistor 144 connected in a series stacked configuration. Voltage regulator circuit 100 can further include a low-side section that can include a fourth NMOS transistor 164, a fifth NMOS transistor 186 and a sixth NMOS transistor 190 connected in a series stacked configuration. In some embodiments, four or more stacked NMOS transistors can be used in each of the high-side and low-side sections. The operating voltage of the voltage regulator circuit 100 can be greater than three times a value of the breakdown voltage of the individual NMOS transistors used in the stack. As appreciated by one of ordinary skill in the art having the benefit of this disclosure, the operating voltage of the voltage regulator circuit 100 can be higher depending on the number of stacked transistors used.

The first NMOS transistor 104 can have a drain 106, a gate 108, and a source 110. The drain 106 of the first NMOS transistor 104 can be connected to the input node 102. The second NMOS transistor 124 can have a drain 122, a gate 126, and a source 128. The source 110 of the first NMOS transistor 104 can be connected to the drain 122 of the second NMOS transistor 124 at node 119. The third NMOS transistor 144 can have a drain 142, a gate 146, and a source 148. The source 128 of the second NMOS transistor 124 can be connected to the drain 142 of the third NMOS transistor 144 at node 138. The source of the third NMOS transistor 144 can be connected to an intermediate node 156 having a voltage Vx.

The fourth NMOS transistor 164 can have a drain 166, a gate 170, and a source 168. The drain 166 of the fourth NMOS transistor 164 can be connected to the intermediate node 156. The fifth NMOS transistor 186 can have a drain 185, a gate 188, and a source 187. The source 168 of the fourth NMOS transistor 164 can be connected to the drain 185 of the fifth NMOS transistor 186 at node 145. The sixth NMOS transistor 190 can have a drain 189, a gate 192, and a source 191. The source 187 of the fifth NMOS transistor 186 can be connected to the drain 189 of the sixth NMOS transistor 190 at node 147. The source of the sixth NMOS transistor 190 can be connected to a ground node 195.

Voltage regulator circuit 100 can further include an inductor 159 that is connected between the output node 158 and the intermediate node 156. An output capacitor 160 can be connected between the output node 158 and ground node 195. A load resistor 162 can be connected between the output node 158 and ground node 195. Voltage regulator circuit 100 can include a first driver 150 and a second driver 193. A power node of the first driver 150 can be connected to a node 130 and a low node of the first driver 150 can be connected to intermediate node 156. An input node 152 of the high-side driver can be driven by a control signal high-side-on (HS_ON), and an output of the first driver 150 can be connected to gate 146 of the third NMOS transistor 144. A power node of the second driver 193 can be connected to a node 180 and a low node of the second driver 193 can be connected to ground node 195. An input node 194 of the low-side driver can be driven by a control signal low-side-on (LS_ON), and an output of the second driver 193 can be connected to gate 192. In some embodiments, a controller (not shown) can generate control signals HS_ON and LS_ON. Voltage regulator circuit 100 can operate using the first and second drivers, 150, 193, respectively, to drive two of its six NMOS transistors, while the other four NMOS transistors can be self-driven. In this way, power can be saved resulting in relatively higher operational efficiency of the voltage regulator circuit 100. The disclosed self-driving method includes using bootstrap switches and capacitors to set the voltages at the terminals (gate, source, drain) of a respective NMOS transistor to desired values without a use of a driver to drive the NMOS transistor. This self-driving method is further described below in FIGS. 3 and 4.

Voltage regulator circuit 100 can further include a first bootstrap capacitor 140, a second bootstrap capacitor 120 and a third bootstrap capacitor 139. Voltage regulator circuit 100 can include a first bootstrap switch 114 connected between nodes 112 and 118, a second bootstrap switch 116 connected between nodes 119 and 118, a third bootstrap switch 132 connected between nodes 130 and 136, a fourth bootstrap switch 134 connected between nodes 138 and 136, a fifth bootstrap switch 174 connected between nodes 172 and 176, and a sixth bootstrap switch 178 connected between nodes 172 and 180. Node 118 can be connected to a voltage VDMH. In some embodiments, voltage VDMH can be a DC voltage having a value of $2V_{in}/3$. Node 136 can be connected to a voltage VDML. In some embodiments, voltage VDML can be a DC voltage having a value of $V_{in}/3$. Node 176 can be connected to voltage VDMH and node 180 can be connected to voltage VDML. As appreciated by one of ordinary skill in the art having the benefit of this disclosure, other suitable voltage values for VDMH and VDML can be used.

Voltage regulator circuit 100 can further include a first clock generator circuit 196 that generates a clock signal 197 ($\Phi_1$), and a second clock generator circuit 198 that generates a clock signal 199 ($\Phi_2$). $\Phi_1$ can be used to drive first bootstrap switch 114, second bootstrap switch 116, third bootstrap switch 132, fourth bootstrap switch 134 and sixth bootstrap switch 178. $\Phi_2$ can be used to drive fifth bootstrap switch 174. In some embodiments, the first clock generator circuit 196 can receive control signals from a controller (not shown) and generate $\Phi_1$ based on the received control signals. In various embodiments, the second clock generator circuit 198 can receive control signals from a controller (not shown) and generate 12 based on the received control signals.

Figure 2:
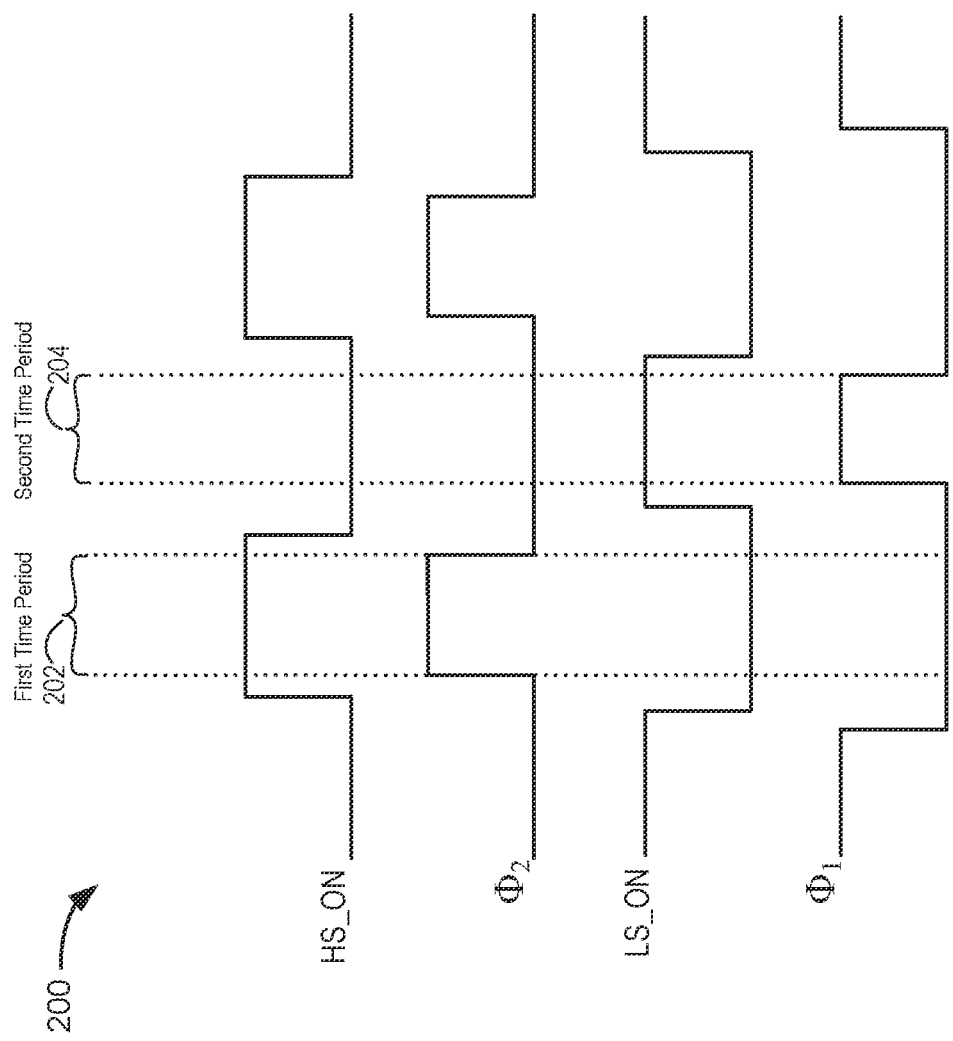
FIG. 2 shows a timing diagram of the high-side and the low-side control signals used by the DC-DC voltage regulator circuit of FIG. 1.

FIG. 2 shows a timing diagram 200 of signals HS_ON, LS_ON, $\Phi_1$ and $\Phi_2$ that can be used to operate voltage regulator circuit 100 show in in FIG. 1. As illustrated in FIG. 2, during a first time period 202, HS_ON and $\Phi_2$ signals are high while LS_ON and $\Phi_1$ signals are low. During a second time period 204, HS_ON and $\Phi_2$ signals are low while LS_ON and $\Phi_1$ signals are high. $\Phi_2$ can be generated such that it goes high after HS_ON goes high, and goes low before HS_ON goes low. The timing difference between 12 and HS_ON can be relatively small. For example, if HS_ON stays high for 5 ns, a timing difference between 12 and HS_ON can be in range of 0.2 to 0.3 ns. $\Phi_1$ can be generated such that it goes low before LS_ON goes low, and goes high after LS_ON goes high. A timing difference between $\Phi_1$ and LS_ON can be relatively small. For example, if LS_ON stays low for 6 ns, timing difference between $\Phi_1$ and LS_ON can be in range of 0.2 to 0.3 ns. It will be appreciated by those skilled in the art having the benefit of this disclosure that other suitable time durations for HS_ON and LS_ON can be used and other suitable time differences between 12 and HS_ON, and $\Phi_1$ and LS_ON can used.

Figure 3:
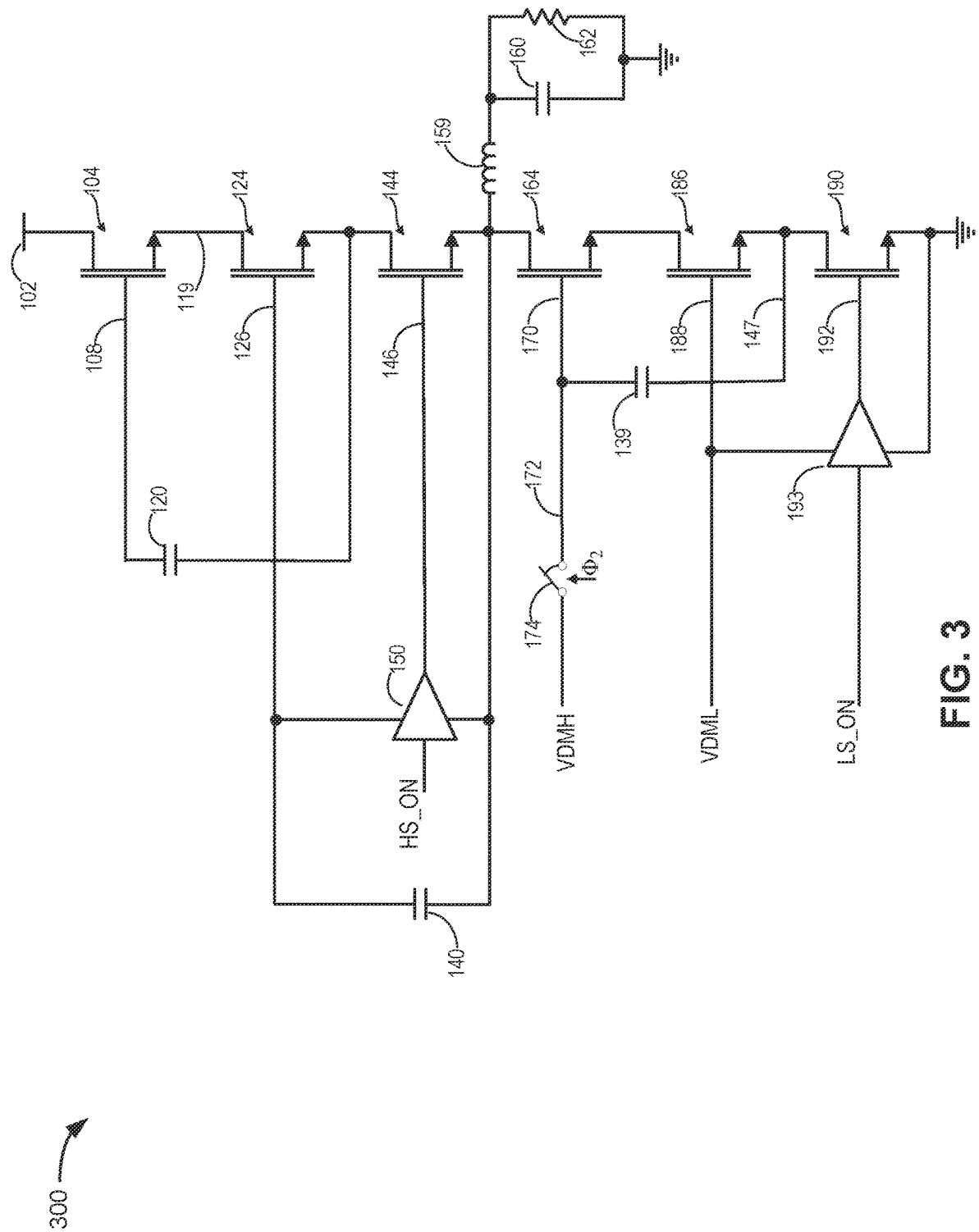
FIG. 3 illustrates an equivalent circuit for the voltage regulator circuit of FIG. 1 during a first time period when high-side section of the voltage regulator circuit of FIG. 1 is active, according to an embodiment of the disclosure.

FIG. 3 illustrates an equivalent circuit 300 for the voltage regulator circuit 100 shown in FIG. 1 during the first time period 202 shown in FIG. 2. As shown in FIG. 3, the operation of voltage regulator circuit 100 is described during the first time period 202 when HS_ON and $\Phi_2$ signals are high while LS_ON and $\Phi_1$ signals are low, according to an embodiment of the disclosure. Referring to FIGS. 1, 2 and 3 simultaneously, HS_ON is applied to the gate 146 of the third NMOS transistor 144 through the first driver 150 and since HS_ON is high, the third NMOS transistor 144 is on, thus pulling node 138 to the same voltage as Vx. The voltage across each of the first bootstrap capacitor 140, the second bootstrap capacitor 120 and the third bootstrap capacitor 139 can have a value of Vin/3, as described in detail further below, thus a gate to source voltage of NMOS transistor 124 is Vin/3. Therefore, NMOS transistor 124 is on. As a result, node 119 is pulled down to the same voltage as Vx. Thus, first NMOS transistor 104 is on because its gate to source voltage has the same value as the voltage across second bootstrap capacitor 120, i.e., Vin/3. Therefore, all three NMOS transistors 104, 124 and 144 are on resulting in Vx getting pulled up to be the same voltage as Vin. The gate charges to turn on these three NMOS transistors 104, 124 and 144 are drawn from the first bootstrap capacitor 140 and the second bootstrap capacitor 120. The gate voltages of these three NMOS transistors 104, 124 and 144 are higher than Vin by a value of Vin/3, i.e., the gate voltages for each of these three NMOS transistors is 4Vin/3.

During the first time period 202, the low-side section NMOS transistors 164, 186 and 190 are off because LS_ON signal is low. In order to distribute the voltage Vx equally across the drain-to-sources of the low-side section NMOS transistor 164, 186 and 190, gate 170 of NMOS transistor 164 can be coupled to VDMH through the fifth bootstrap switch 174 because $\Phi_2$ is high, thus during this period the fifth bootstrap switch 174 is on. In this way, the voltage at node 172 can be set to a known voltage. Further, a voltage at node 147 can be set because the voltage at node 172 is known and node 147 is connected to node 172 through the third bootstrap capacitor 139.

Figure 4:
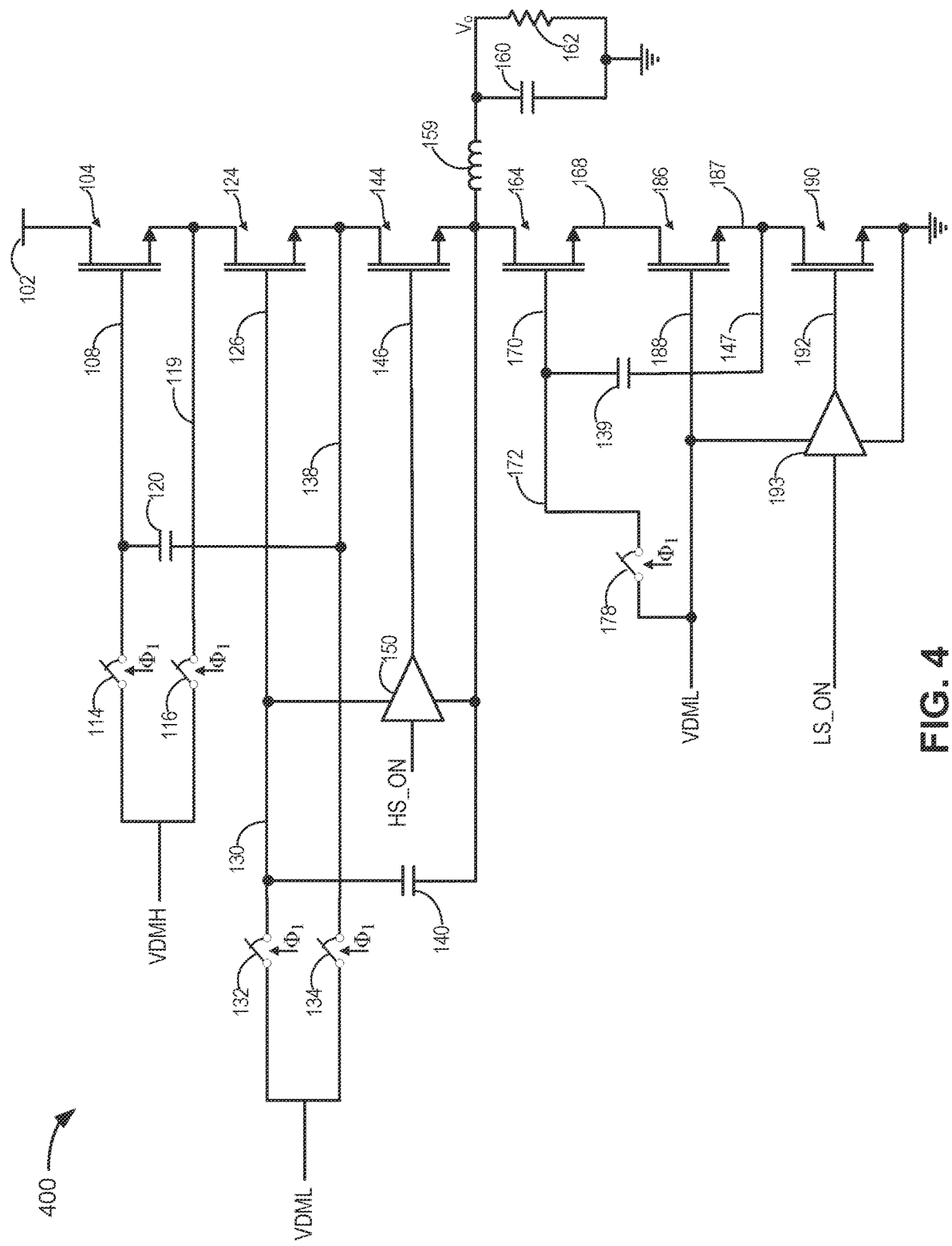
FIG. 4 illustrates an equivalent circuit for the voltage regulator circuit of FIG. 1 during a second time period when low-side section of the voltage regulator circuit of FIG. 1 is active, according to an embodiment of the disclosure.

FIG. 4 illustrates an equivalent circuit 400 for the voltage regulator circuit 100 shown in FIG. 1 during the second time period 204 shown in FIG. 2. As shown in FIG. 4, the operation of voltage regulator circuit 100 is described during the second time period 204 when HS_ON and $\Phi_2$ signals are low while LS_ON and $\Phi_1$ signals are high, according to an embodiment of the disclosure. Referring to FIGS. 1, 2 and 4 simultaneously, LS_ON is applied to the gate 192 of the sixth NMOS transistor 190 through the second driver 193 and since LS_ON is high, the sixth NMOS transistor 190 is on. The fifth NMOS transistor 186 is also on because its gate 188 is connected to VDML, which has a value of Vin/3, and its source 187, pulled down by sixth transistor 190, is at ground. The fourth NMOS transistor 164 is also on because its gate 170 is connected to VDML through sixth bootstrap switch 178 that is on since $\Phi_1$ is high, and its source 168, pulled down by fifth transistors 186, is at ground. A charge of the third bootstrap capacitor 139 can be replenished through the sixth bootstrap switch 178 and the sixth NMOS transistor 190 so that it can maintain its voltage at or substantially at VDML=Vin/3.

During the second time period 204, in the high-side section, the first, second, third and fourth bootstrap switches 114, 116, 132 and 134, respectively, are on because $\Phi_1$ is high. A charge of the first bootstrap capacitor 140 can be replenished from VDML since the third bootstrap switch 132 is on. A charge of the second bootstrap capacitor 120 can be replenished from VDMH since the first bootstrap switch 114 is on. Thus, a value of the voltages across the first bootstrap capacitor 140 and the second bootstrap capacitor 120 is at or substantially at Vin/3. The second and fourth bootstrap switches 116 and 134, respectively, can be used to set a voltage at node 119 and 138 to 2Vin/3 and Vin/3, respectively. In this way, voltage stresses can be distributed equally among the first, second and third NMOS transistors 104, 124 and 144.

In some embodiments, a higher number of bootstrap switches in the high-side may be used than in the low-side section so as to distribute voltage stresses equally among the drain-to-sources of the NMOS transistors, because the gate voltages at 108, 126 and 146 may experience relatively higher voltage swings, for example up to 4Vin/3, than those in the low-side section. Thus, there may be relatively more charge sharing between switching nodes, including drains and sources, of the NMOS transistors in the high-side section. Therefore, the second and fourth bootstrap switches 116 and 134, respectively, can be used to balance the voltage stresses in the high-side section.

Figure 5A:
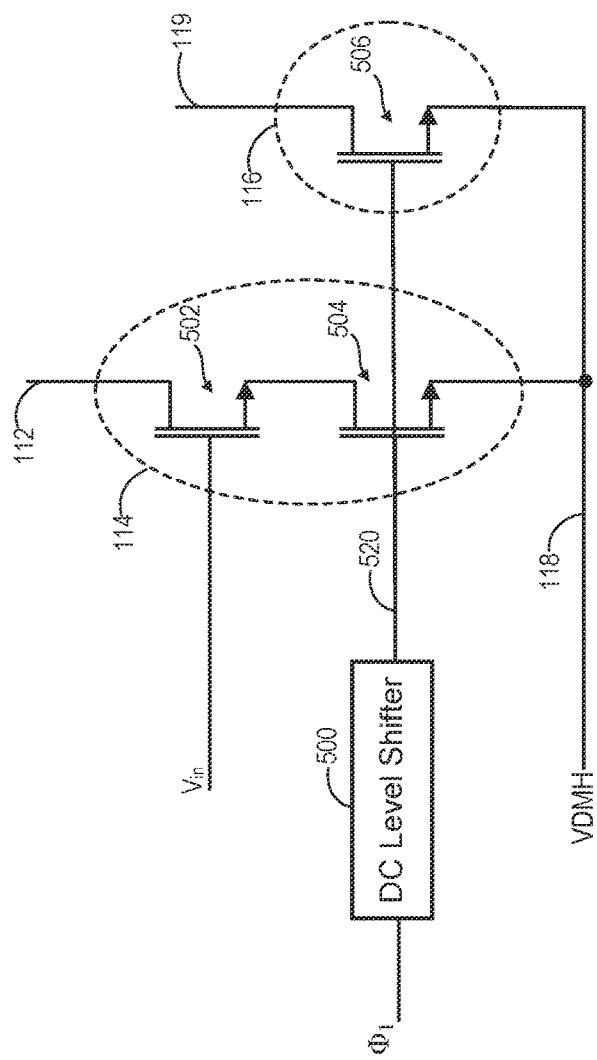
FIG. 5A illustrates a schematic of first and second bootstrap switches of the voltage regulator circuit of FIG. 1, according to an embodiment of the disclosure.

FIG. 5A illustrates a schematic of the first and second bootstrap switches 114 and 116 of circuit 100, according to an embodiment of the disclosure. As shown in FIG. 5A, the first bootstrap switch 114 can include NMOS transistors 502 and 504 that are connected in series. The second bootstrap switch 116 can include NMOS transistor 506. NMOS transistors 502, 504 and 506 can be implemented using thin-oxide short channel MOSFETs. In this way, die area can be saved and power losses can be reduced. A breakdown voltage of NMOS transistors 502, 504 and 506 can be Vin/3. As appreciated by one of ordinary skill in the art having the benefit of this disclosure, other suitable values for the breakdown voltage of NMOS transistors 502, 504 and 506 can be used as well as other suitable types and configurations of switches.

In the illustrated embodiment, the first bootstrap switch 114 can include a stack of two NMOS transistors 502 and 504 because node 112 can have a voltage swing between VDMH (2Vin/3) and 4Vin/3, for a total voltage stress of 2Vin/3. A gate of NMOS transistor 502 can be connected to Vin in order to limit a voltage stress on NMOS transistors 502 and 504. The second bootstrap switch 116 can include a single NMOS transistor 506 because node 119 can have a voltage swing between VDMH (2Vin/3) and Vin, for a total voltage stress of Vin/3.

NMOS transistors 504 and 506 can be controlled by a voltage at node 520. Since the voltage at node 520 may swing between two DC voltage levels, a first DC level shifter 500 may be used to generate the voltage at node 520 from signals received from a controller, where the received signals can typically have a value between 0 V and Vin/3. As appreciated by one of ordinary skill in the art having the benefit of this disclosure, other suitable values for received signals can be used.

Figure 5B:
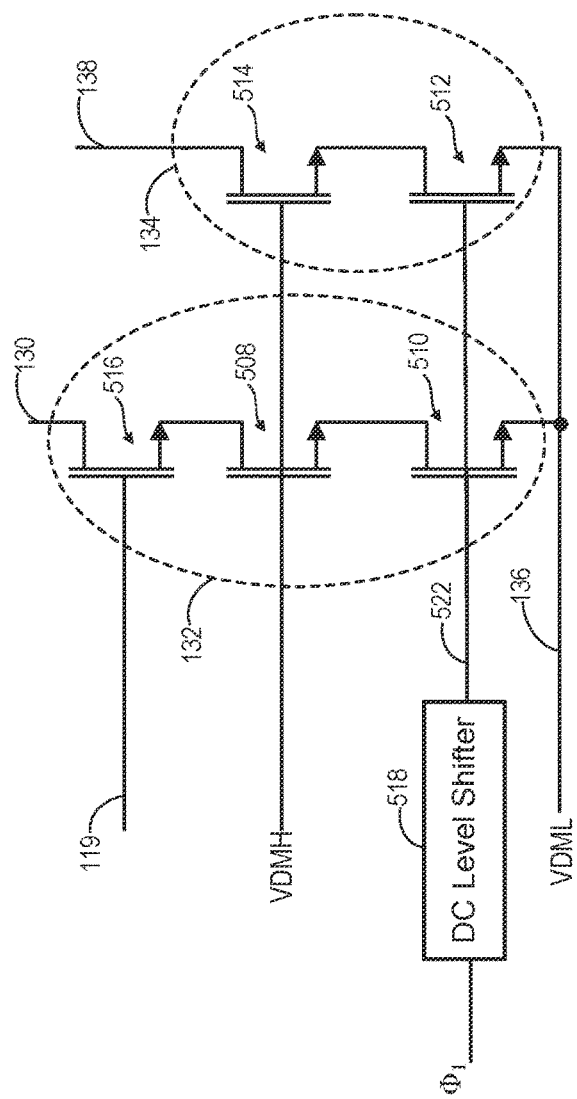
FIG. 5B illustrates a schematic of third and fourth bootstrap switches of the voltage regulator circuit of FIG. 1, according to an embodiment of the disclosure.

FIG. 5B illustrates a schematic of the third and fourth bootstrap switches 132 and 134 of circuit 100, according to an embodiment of the disclosure. As shown in FIG. 5B, the third bootstrap switch 132 can include NMOS transistors 516, 508 and 510 that are connected in series. The fourth bootstrap switch 134 can include NMOS transistors 514 and 512 that are connected in series. In the illustrated embodiment, the third bootstrap switch 132 can include a stack of three NMOS transistors 516, 508 and 510 because node 130 can have a voltage swing between VDMHL (Vin/3) and 4Vin/3, for a total voltage stress of Vin. A gate of NMOS transistor 508 can be connected to VDMH in order to limit a voltage stress on NMOS transistor 510 to less than Vin/3. A gate of NMOS transistor 516 can be connected to node 119. Node 119 may vary similar to node 130. In this way, a voltage stress on NMOS transistor 516 can be limited to less than Vin/3 when the high-side section is off. When the high-side section is on, node 119 is at Vin, limiting a voltage stress on NMOS transistors 516 and 508 to less than Vin/3.

As shown in FIG. 5B, the fourth bootstrap switch 134 can include NMOS transistors 514 and 512 that are connected in series. A gate of NMOS transistor 514 can be connected to VDMH. In this way, a voltage stress on NMOS transistors 514 and 512 can be limited to less than Vin/3. A voltage at node 522 controls the gates of NMOS transistor 510 and 512. A second level shifter 518 can generate the voltage at node 522 to swing between VDML-VDMH.

Figure 6:
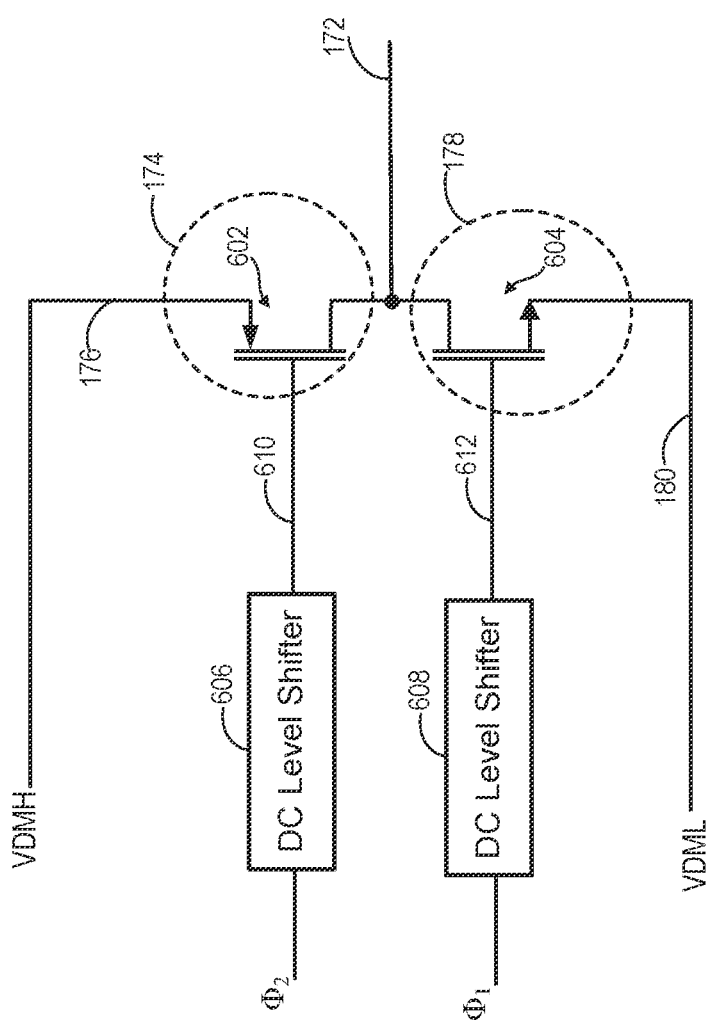
FIG. 6 illustrates a schematic of the fifth and sixth bootstrap switches of the voltage regulator circuit of FIG. 1, according to an embodiment of the disclosure.

FIG. 6 illustrates a schematic of the fifth and sixth bootstrap switches 174 and 178 of circuit 100, according to an embodiment of the disclosure. As shown in FIG. 6, the fifth bootstrap switch 174 can include a PMOS transistor 602, while the sixth bootstrap switch 178 can include an NMOS transistor 604. A single thin oxide MOSFET can be used for each of the fifth and sixth bootstrap switches because node 172 may swing between 2Vin/3 and Vin/3. A voltage at gate 610 of PMOS transistor 602 can be generated by a third level shifter 606, where the voltage at gate 610 of PMOS transistor 602 may swing between VDMH and VDML. A control voltage at gate 612 of NMOS transistor 604 can be generated by a fourth level shifter 608, where the voltage at gate 612 of NMOS transistor 604 may swing between VDMH and VDML.

It will be understood by one of ordinary skill in the art having the benefit of this disclosure that there can be alternative methods of controlling the switches in circuit 100 in order to distribute voltage stresses equally among the switches in order to keep the switches operating within their safe operating area (SOA). It will be further understood by one of ordinary skill in the art that alternate methods of controlling the switches in circuit 100 can be utilized in order to optimize light load efficiency, or to minimize area, and/or to minimize electromagnetic interference (EMI), and such methods are within the scope of this disclosure. In particular although examples have been described herein showing a particular number and configuration of switches it will be appreciated that these figures were for example purposes only and that other embodiments may employ a lesser number or greater number of switches to maintain the switches within their SOA.

Although series stacked DC-DC voltage regulator circuits are described and illustrated herein with respect to one particular configuration of series stacked DC-DC voltage regulator circuits, embodiments of the disclosure may be suitable for use with other configurations of DC-DC voltage regulators.

In some embodiments, the described switches can be formed in silicon, or any other suitable semiconductor material. In various embodiments, the disclosed MOSFETS in FIGS. 1, 5A, 5B and 6 can all be formed within one single die well and/or on a single monolithic die. In some embodiments, the disclosed series stacked DC-DC voltage regulator circuit (including the transistors and the control circuitry) can be monolithically integrated onto a single die. In various embodiments, the high-side and low-side sections can be formed on separate, respective, individual die. In some embodiments, the high-side and low-side sections and the control circuits and any combination of them can be formed in groups on separate die, for example, high-side and low-side sections can be formed on a single die and the control circuits may be formed on a separate die, or high-side and low-side sections can be formed on the same die as the control circuits. In various embodiments, the high-side and low-side sections and the control circuits can all be integrated into one electronic package, for example, but not limited to, into a quad-flat no-lead (QFN) package, or into a dual-flat no-leads (DFN) package, into a ball grid array (BGA) package.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A circuit comprising:
   a power input terminal and an output terminal;
   a high-side circuit coupled between the power input terminal and the output terminal, wherein the high-side circuit includes a first plurality of serially connected switches; and
   a low-side circuit coupled between the output terminal and a ground, wherein the low-side circuit includes a second plurality of serially connected switches;
   wherein a first voltage between the power input terminal and the output terminal is distributed across the first plurality of serially connected switches;
   wherein a second voltage between the output terminal and the ground is distributed across the second plurality of serially connected switches; and
   wherein each of the first plurality of serially connected switches are N-channel metal oxide semiconductor transistors (NMOS) and each of the second plurality of serially connected switches are NMOS transistors, and wherein a drain terminal of a first switch of the second plurality of serially connected switches is connected to the output terminal.

2. The circuit of claim 1, wherein the high-side circuit and the low-side circuit are arranged to limit a maximum voltage applied to each of the first plurality of serially connected switches and each of the second plurality of serially connected switches to a fraction of a voltage at the power input terminal.

3. The circuit of claim 2, wherein a value of the fraction is ⅓ or less.

4. The circuit of claim 1, further comprising a first bootstrap circuit that is arranged to be controlled by a first pair of bootstrap control switches that selectively transition the first bootstrap circuit between a charging configuration that charges the first bootstrap circuit, and a discharging configuration that provides a charge for a turn on of a second switch of the first plurality of serially connected switches.

5. A circuit comprising:
a power input terminal and an output terminal;
a high-side circuit coupled between the power input terminal and the output terminal, wherein the high-side circuit includes a first plurality of serially connected switches;
a low-side circuit coupled between the output terminal and a ground, wherein the low-side circuit includes a second plurality of serially connected switches; and
a high-side driver circuit connected to a gate terminal of a first switch of the first plurality of serially connected switches;
wherein a gate terminal of a second switch of the first plurality of serially connected switches is connected to a drain terminal of the first switch of the first plurality of serially connected switches through a first bootstrap capacitor; and
wherein each of the first plurality of serially connected switches are N-channel metal oxide semiconductor transistors (NMOS) and each of the second plurality of serially connected switches are NMOS transistors, and wherein a drain terminal of a first switch of the second plurality of serially connected switches is connected to the output terminal.

6. The circuit of claim 5, further comprising a low-side driver circuit connected to a gate terminal of a first switch of the second plurality of serially connected switches.

7. The circuit of claim 6, wherein a gate terminal of a second switch of the second plurality of serially connected switches is connected to the drain terminal of the first switch of the second plurality of serially connected switches through a second bootstrap capacitor.

8. The circuit of claim 5, wherein the high-side circuit and the low-side circuit are arranged to limit a maximum voltage applied to each of the first plurality of serially connected switches and each of the second plurality of serially connected switches to a fraction of a voltage at the power input terminal.

9. The circuit of claim 8, wherein a value of the fraction is ⅓ or less.

10. The circuit of claim 5, further comprising a first bootstrap circuit that is arranged to be controlled by a first pair of bootstrap control switches that selectively transition the first bootstrap circuit between a charging configuration that charges the first bootstrap circuit, and a discharging configuration that provides a charge for a turn on of the second switch of the first plurality of serially connected switches.

11. A circuit comprising:
a power input terminal and an output terminal;
a high-side circuit coupled between the power input terminal and the output terminal, wherein the high-side circuit includes a first plurality of serially connected switches;
a low-side circuit coupled between the output terminal and a ground, wherein the low-side circuit includes a second plurality of serially connected switches; and
wherein a first voltage between the power input terminal and the output terminal is distributed across the first plurality of serially connected switches;
wherein a second voltage between the output terminal and the ground is distributed across the second plurality of serially connected switches;
a high-side driver circuit connected to a gate terminal of a first switch of the first plurality of serially connected switches;
wherein a gate terminal of a second switch of the first plurality of serially connected switches is connected to a drain terminal of the first switch of the first plurality of serially connected switches through a first bootstrap capacitor; and
wherein each of the first plurality of serially connected switches are N-channel metal oxide semiconductor transistors (NMOS) and each of the second plurality of serially connected switches are NMOS transistors, and wherein a drain terminal of a first switch of the second plurality of serially connected switches is connected to the output terminal.

12. The circuit of claim 11, wherein the high-side circuit and the low-side circuit are arranged to limit a maximum voltage applied to each of the first plurality of serially connected switches and each of the second plurality of serially connected switches to a fraction of a voltage at the power input terminal.

13. The circuit of claim 12, wherein a value of the fraction is ⅓ or less.

14. The circuit of claim 11, further comprising a first bootstrap circuit that is arranged to be controlled by a first pair of bootstrap control switches that selectively transition the first bootstrap circuit between a charging configuration that charges the first bootstrap circuit, and a discharging configuration that provides a charge for a turn on of the second switch of the first plurality of serially connected switches.

* * * * *